United States Patent
Ito et al.

(10) Patent No.: US 12,497,004 B2
(45) Date of Patent: Dec. 16, 2025

(54) BRAKE PEDAL DEVICE

(71) Applicant: DENSO CORPORATION, Kariya (JP)

(72) Inventors: Kengo Ito, Kariya (JP); Etsugo Yanagida, Kariya (JP); Masashi Arao, Kariya (JP); Daisuke Hokuto, Kariya (JP); Yasuhisa Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/500,573

(22) Filed: Nov. 2, 2023

(65) Prior Publication Data

US 2024/0059260 A1    Feb. 22, 2024

Related U.S. Application Data

(63) Continuation of application No. PCT/JP2022/013793, filed on Mar. 24, 2022.

(30) Foreign Application Priority Data

May 14, 2021  (JP) ................. 2021-082795

(51) Int. Cl.
*B60T 7/04*    (2006.01)
(52) U.S. Cl.
CPC ........... *B60T 7/042* (2013.01); *B60T 2270/82* (2013.01)
(58) Field of Classification Search
CPC ........ B60T 7/042; B60T 2270/82; G05G 1/44
See application file for complete search history.

(56) References Cited

U.S. PATENT DOCUMENTS

| 2,261,878 | A | * | 11/1941 | Hathaway | ................. B21F 3/06 |
| | | | | | 148/580 |
| 2,582,343 | A | * | 1/1952 | Lilley | .................... H01C 10/14 |
| | | | | | 338/153 |

(Continued)

FOREIGN PATENT DOCUMENTS

| JP | 6450131 U | 3/1989 |
| JP | S6450131 U | 3/1989 |

(Continued)

OTHER PUBLICATIONS

U.S. Appl. No. 18/454,564 to Daisuke Hokuto et al., filed Aug. 23, 2023 (62 pages).

(Continued)

*Primary Examiner* — Thomas C Diaz
(74) *Attorney, Agent, or Firm* — Nixon & Vanderhye P.C.

(57) ABSTRACT

A brake pedal device includes a pedal pad rotatable about an axis when stepped on by a driver, and a reaction force generation mechanism generating a reaction force to the pedal pad according to a stepping amount of the pedal pad. The pedal pad includes a pedal base portion extending away from an axis side end to another end, and a pedal operation portion attached to the pedal base portion and stepped on by the driver. The pedal operation portion protrudes toward a pedal return side in a rotation direction about the axis with respect to the pedal base portion, and a surface of the pedal operation portion has a plane portion that is configured as a flat surface and is stepped on by the driver, so that the reaction force generated by the reaction force generation mechanism acts on the pedal pad in a direction piercing the plane portion.

24 Claims, 11 Drawing Sheets

(56) References Cited

U.S. PATENT DOCUMENTS

| | | | | |
|---|---|---|---|---|
| 2,779,209 | A * | 1/1957 | Estes | B60T 7/06 |
| | | | | 74/519 |
| 4,182,198 | A * | 1/1980 | Dartnell | B60K 26/02 |
| | | | | 74/513 |
| 4,818,036 | A * | 4/1989 | Reinecke | B60T 7/042 |
| | | | | 303/50 |
| 11,036,252 | B1 * | 6/2021 | McKeefery | B60K 26/021 |
| 11,364,881 | B2 * | 6/2022 | Kim | B60T 7/06 |
| 2014/0117602 | A1 | 5/2014 | Jeon | |
| 2018/0275712 | A1 | 9/2018 | Isono | |
| 2019/0299781 | A1 | 10/2019 | Inoue et al. | |
| 2021/0300180 | A1 * | 9/2021 | Kihara | G05G 1/44 |
| 2021/0370769 | A1 | 12/2021 | Kita et al. | |

FOREIGN PATENT DOCUMENTS

| | | |
|---|---|---|
| JP | H11152073 A | 6/1999 |
| JP | 2003165426 A | 6/2003 |
| JP | 2004189115 A | 7/2004 |
| JP | 2010-73144 | 4/2010 |
| JP | 2011204193 A | 10/2011 |
| JP | 2017049892 A | 3/2017 |
| JP | 2022130112 A | 9/2022 |
| JP | 2022130113 A | 9/2022 |
| WO | 2020195117 A1 | 10/2020 |

OTHER PUBLICATIONS

U.S. Appl. No. 18/454,630 to Takao Yamamoto et al., filed Aug. 23, 2023 (42 pages).

U.S. Appl. No. 18/500,944 to Masashi Arao, filed Nov. 2, 2023 (94 pages).

U.S. Appl. No. 18/500,853 to Yasuhisa Fukuda et al., filed Nov. 2, 2023 (117 pages).

U.S. Appl. No. 18/501,607 to Daisuke Hokuto et al., filed Nov. 3, 2023 (75 pages).

U.S. Appl. No. 18/500,775 to Daisuke Hokuto, filed Nov. 2, 2023 (73 pages).

U.S. Appl. No. 18/501,718 to Yasuhisa Fukuda, filed Nov. 3, 2023 (58 pages).

U.S. Appl. No. 18/500,599 to Kengo Ito et al., filed Nov. 2, 2023 (49 pages).

U.S. Appl. No. 18/500,962 to Atsushi Nishimura et al., filed Nov. 2, 2023 (43 pages).

* cited by examiner

BRAKE PEDAL DEVICE

CROSS REFERENCE TO RELATED APPLICATION

The present application is a continuation application of International Patent Application No. PCT/JP2022/013793 filed on Mar. 24, 2022, which designated the U.S. and claims the benefit of priority from Japanese Patent Application No. 2021-082795 filed on May 14, 2021. The entire disclosures of all of the above applications are incorporated herein by reference.

TECHNICAL FIELD

The present disclosure generally relates to a brake pedal device.

BACKGROUND

Conventionally, a brake pedal device is known in which a rotating shaft that rotatably supports a pedal pad is arranged at a position closer to a driver than a pedal operation portion in the pedal pad.

SUMMARY

According to an aspect of the present disclosure, a brake pedal device to be mounted on a vehicle includes a pedal pad configured to rotate about a predetermined axis when stepped on by a driver, and a reaction force generation mechanism configured to generate a reaction force to the pedal pad according to a stepped amount of the pedal pad. The pedal pad includes a pedal base portion extending away from one end close to the axis to another end, and a pedal operation portion attached to the pedal base portion to be stepped on by the driver. The pedal operation portion protrudes from the pedal base portion toward a pedal return side in a rotation direction about the axis, and a surface of the pedal operation portion has a plane portion that is configured as a flat surface to be stepped on by the driver. Furthermore, the reaction force generation mechanism is configured to generate the reaction force acting on the pedal pad in a direction piercing the plane portion.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
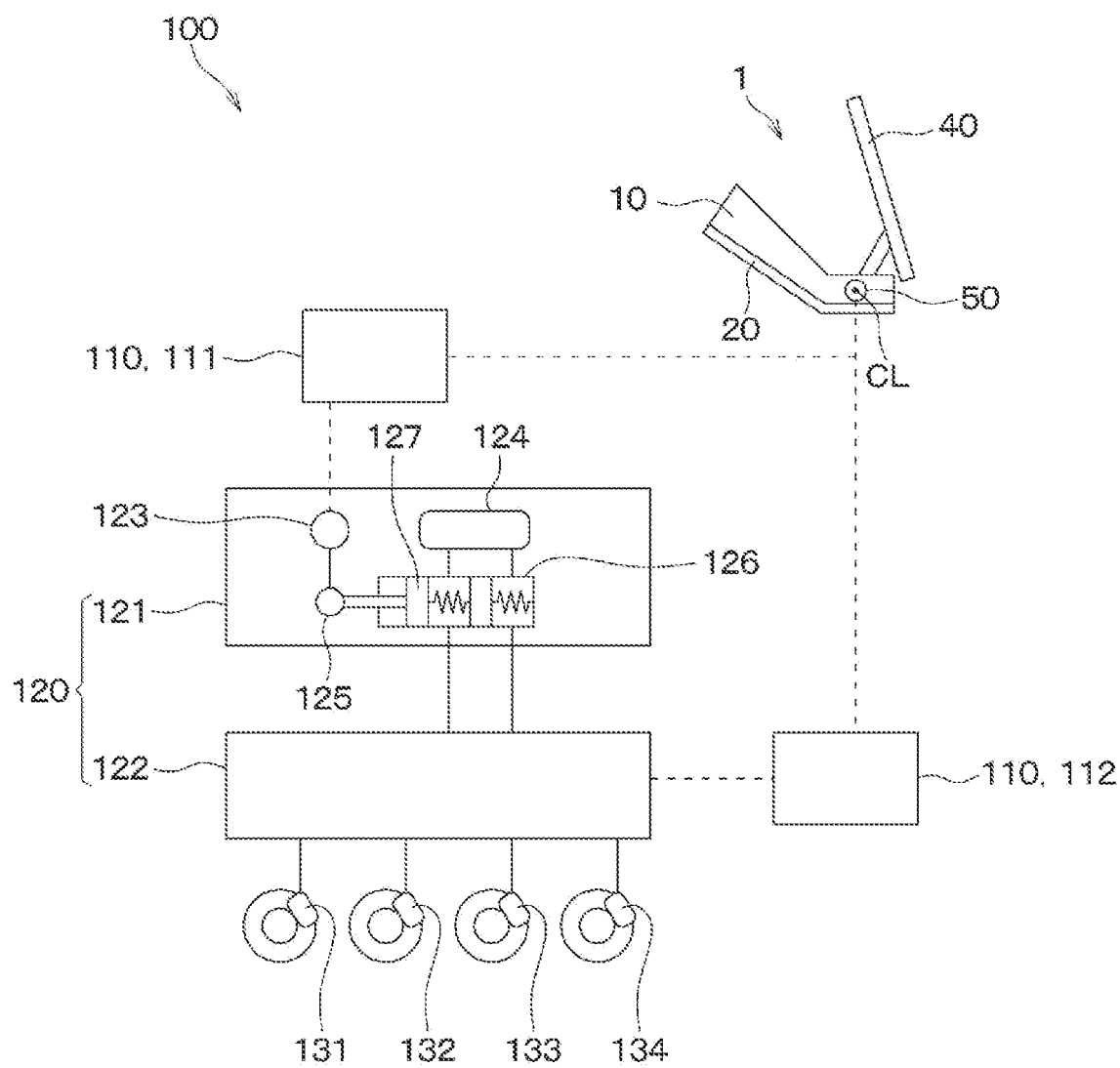
FIG. 1 is a diagram showing a configuration of a brake system according to a first embodiment.

In a brake pedal, a reaction force may be applied to a pedal pad from a back surface of the pedal pad when a pedal operation portion is stepped on. Further, the pedal operation portion may have a convex surface portion formed of a curved surface protruding with a predetermined radius of curvature on a driver's seat side, and a flat surface portion connected to a tip side of the convex surface portion. In this case, a tall person may cause to put the sole of a shoe in contact with both of the convex surface portion and the flat surface portion so as to be in a surface contact state.

However, according to the study of the inventors of the present application, in the brake pedal, since a plane portion to which a stepping force is easily and stably applied is positioned on a tip side of the convex surface portion, a position where the stepping force acts on the pedal operation portion and a position where a reaction force acts on the pedal operation portion are separated from each other by a large amount of separation. In this case, the pedal pad may receive a stress for bending that is undesired.

It is an object of the present disclosure to provide a brake pedal device having a reduced amount of divergence (i.e., separation) between a position where stepping force acts on a pedal operation portion and a position where a reaction force acts on a pedal pad, even in case where a rotating shaft is positioned closer to a driver than the pedal operation portion and the pedal pad receives the stress.

According to an aspect of the present disclosure, a brake pedal device to be mounted on a vehicle includes a pedal pad configured to rotate about a predetermined axis when stepped on by a driver, and a reaction force generation mechanism configured to generate a reaction force to the pedal pad according to a stepped amount of the pedal pad. The pedal pad includes a pedal base portion extending away from one end close to the axis to an another end, and a pedal operation portion attached to the pedal base portion to be stepped on by the driver. The pedal operation portion protrudes from the pedal base portion toward a pedal return side in a rotation direction about the axis, and a surface of the pedal operation portion has a plane portion that is configured as a flat surface to be stepped on by the driver. Furthermore, the reaction force generation mechanism is configured to generate the reaction force acting on the pedal pad in a direction piercing the plane portion.

In such manner, the reaction force generated by the reaction force generation mechanism acts on the pedal pad in a direction of piercing the flat portion on which the stepping force of the driver acts stably. Therefore, an amount of divergence (separation) between a position where the stepping force acts on the pedal operation portion and a position where the reaction force acts on the pedal pad can be reduced.

Embodiments of the present disclosure will be described with reference to the drawings. In the following embodiments, the same or equivalent parts are denoted by the same reference numerals, and explanations will be provided once for the representative one among the parts bearing the same reference numerals.

First Embodiment

The first embodiment of the present disclosure will be described in the following. As shown in FIG. 1, a brake system 100 of the present embodiment is mounted on a vehicle and has a brake pedal device 1, an ECU 110, a brake circuit 120, and brake calipers 131, 132, 133, and 134.

Based on the electric signal output from a sensor unit 50 of the brake pedal device 1, the brake circuit 120 generates a hydraulic pressure required for braking the vehicle and drives the brake calipers 131, 132, 133, and 134 under drive control of the ECU 110.

In the brake system 100, the ECU 110 is made of a first ECU 111 and a second ECU 112. Also, although the brake circuit 120 is made of a first brake circuit 121 and a second brake circuit 122, the configuration is not limited to the above.

An electric signal output from the sensor unit 50 of the brake pedal device 1 is transmitted to the first ECU 111 and the second ECU 112. The first ECU 111 has a calculation circuit, a memory, a drive circuit, or the like, which are not shown. The first ECU 111 supplies electric power to an electric motor 123 of the first brake circuit 121 or the like to drive and control the first brake circuit 121. The second ECU 112 also has a calculation circuit, a memory, a drive circuit, or the like (not shown). The second ECU 112 drives and controls an electromagnetic valve, a motor, or the like (not shown) of the second brake circuit 122. The memories of the first ECU 111 and the second ECU 112 are non-transitory, substantial storage media.

The first brake circuit 121 has a reservoir 124, the electric motor 123, a gear mechanism 125, a master cylinder 126, or the like. The reservoir 124 stores brake fluid. The electric motor 123 drives the gear mechanism 125. The gear mechanism 125 reciprocates a master piston 127 of the master cylinder 126 in the axial direction of the master cylinder 126. Movement of the master piston 127 increases the hydraulic pressure of the brake fluid supplied from the reservoir 124 to the master cylinder 126, and the hydraulic pressure is supplied from the first brake circuit 121 to the second brake circuit 122.

The second brake circuit 122 is a circuit for performing normal control, ABS control, VSC control, etc. by controlling the hydraulic pressure of each of the brake calipers 131 to 134 according to the control signal from the second ECU 112. ABS stands for Anti-lock Braking System, and VSC stands for Vehicle Stability Control. The brake calipers 131 to 134 arranged on each of wheels drive the brake pads provided on each of the wheels.

When a driver of the vehicle steps on a pedal pad 40 of the brake pedal device 1, a signal corresponding to a rotation angle of the pedal pad 40 (that is, an amount of pedal operation) is output from the sensor unit 50 to the first 111 and the second 112. The first ECU 111 drives the electric motor 123 to decelerate the vehicle. As a result, when the rotation speed of the electric motor 123 increases, the master cylinder 126 increases the pressure of the brake fluid supplied from the reservoir 124. The hydraulic pressure of the brake fluid is transmitted from the first brake circuit 121 to the second brake circuit 122.

The second ECU 112 performs normal control, ABS control, VSC control, or the like. For example, the second ECU 112 controls driving of each of solenoid valves of the second brake circuit 122 in normal control for braking according to the operation of the pedal pad 40 by the driver. Thereby, the hydraulic pressure supplied from the first brake circuit 121 is supplied to the brake calipers 131 to 134 via the second brake circuit 122. Each of the brake calipers 131 to 134 drives the brake pad of the corresponding wheel to press the brake pad against the corresponding brake disc. As a result, each of the brake pads comes into frictional contact with the corresponding brake disc, the braking force is generated at each of the wheels, and the vehicle is decelerated.

For example, the second ECU 112 calculates a slip ratio of each wheel based on the speed of each wheel of the vehicle and the vehicle speed, and performs ABS control based on the calculation result. In ABS control, the hydraulic pressure supplied to each of the brake calipers 131 to 134 is adjusted to prevent each of the wheels from locking. Also, for example, the second ECU 112 calculates a sideslip state of the vehicle based on the yaw rate, steering angle, acceleration, each of wheel speeds, vehicle speed, etc., and performs VSC control based on the calculation result. The VSC control selects a wheel to be controlled for stabilizing the turning of the vehicle, and increases the hydraulic pressure of the brake calipers 131 to 134 corresponding to the selected wheel, thereby suppressing a side slip of the vehicle. Thus, the vehicle can stably travel. In addition to the normal control, ABS control, and VSC control described above, the second ECU 112 may also perform collision avoidance control, regenerative cooperation control, or the like based on signals from other ECUs (not shown).

The configuration of the brake pedal device 1 will be described in detail below with reference to FIGS. 2 to 6. The brake pedal device 1 is mounted on a vehicle and is an organ-type pedal device that is stepped on by a stepping force of the driver. The organ-type brake pedal device 1 has a configuration in which a portion of the pedal pad 40 that is stepped on by the driver is arranged above a rotation axis CL in the vertical direction when mounted on the vehicle. The three-dimensional coordinates shown in FIGS. 1 to 5 indicate the vertical direction of the vehicle, the longitudinal direction of the vehicle, and the lateral direction of the vehicle when the brake pedal device 1 is mounted on the vehicle.

In this brake pedal device 1, part of the pedal pad 40 which is in front of the vehicle relative to the rotation axis CL moves toward a floor 2 or toward a dash panel in a vehicle compartment in response to an increase in a stepping force of the driver applied to the pedal pad 40. In the following description, the floor 2 or the dash panel of the vehicle to which the brake pedal device 1 is attached is referred to as a vehicle body.

Figure 2:
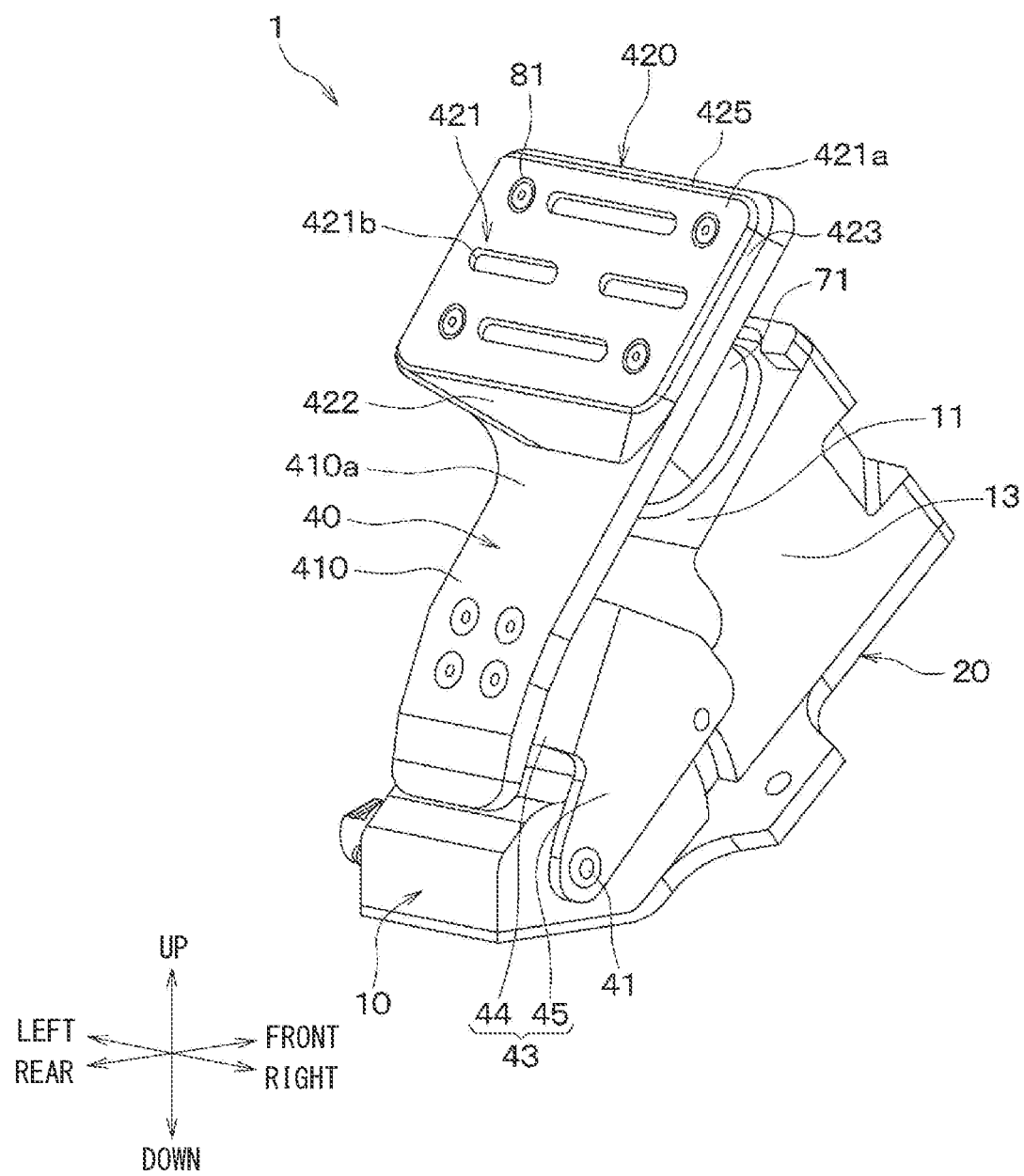
FIG. 2 is a perspective view of a brake pedal device.
Figure 3:
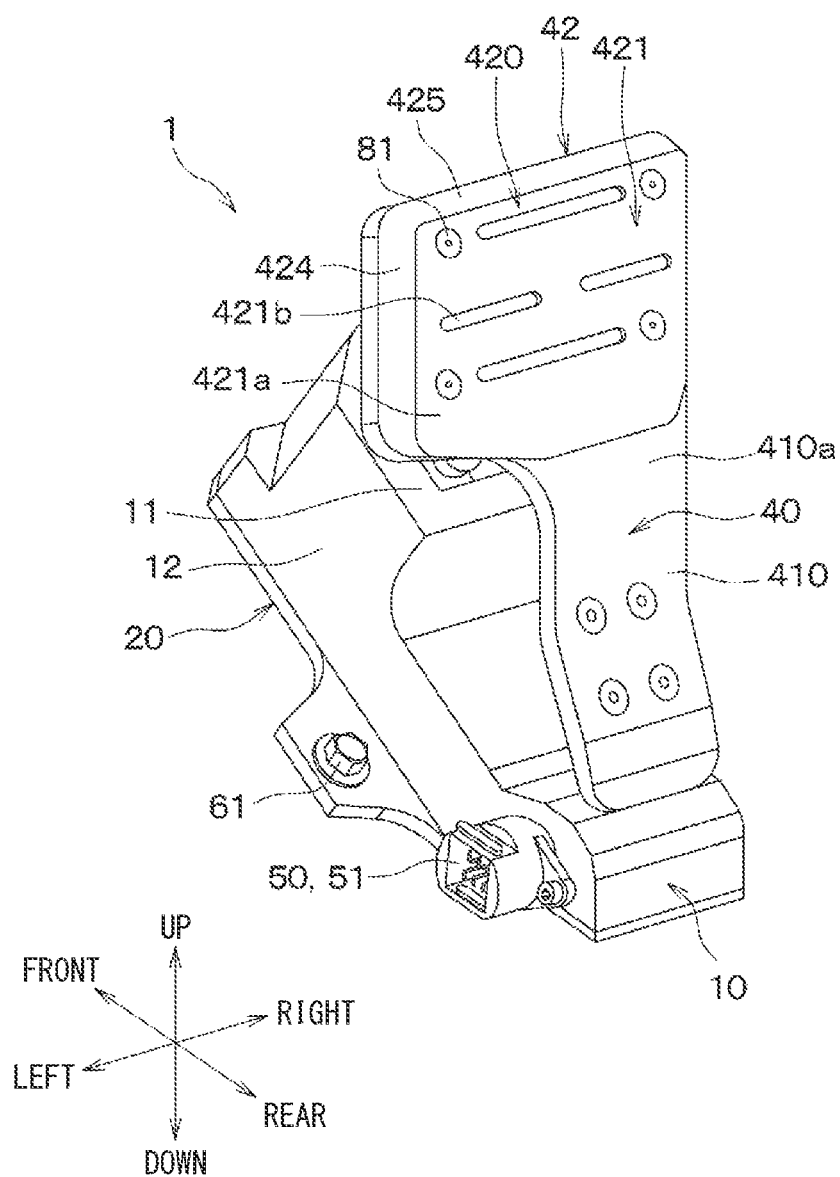
FIG. 3 is an another perspective view of the brake pedal device.
Figure 4:
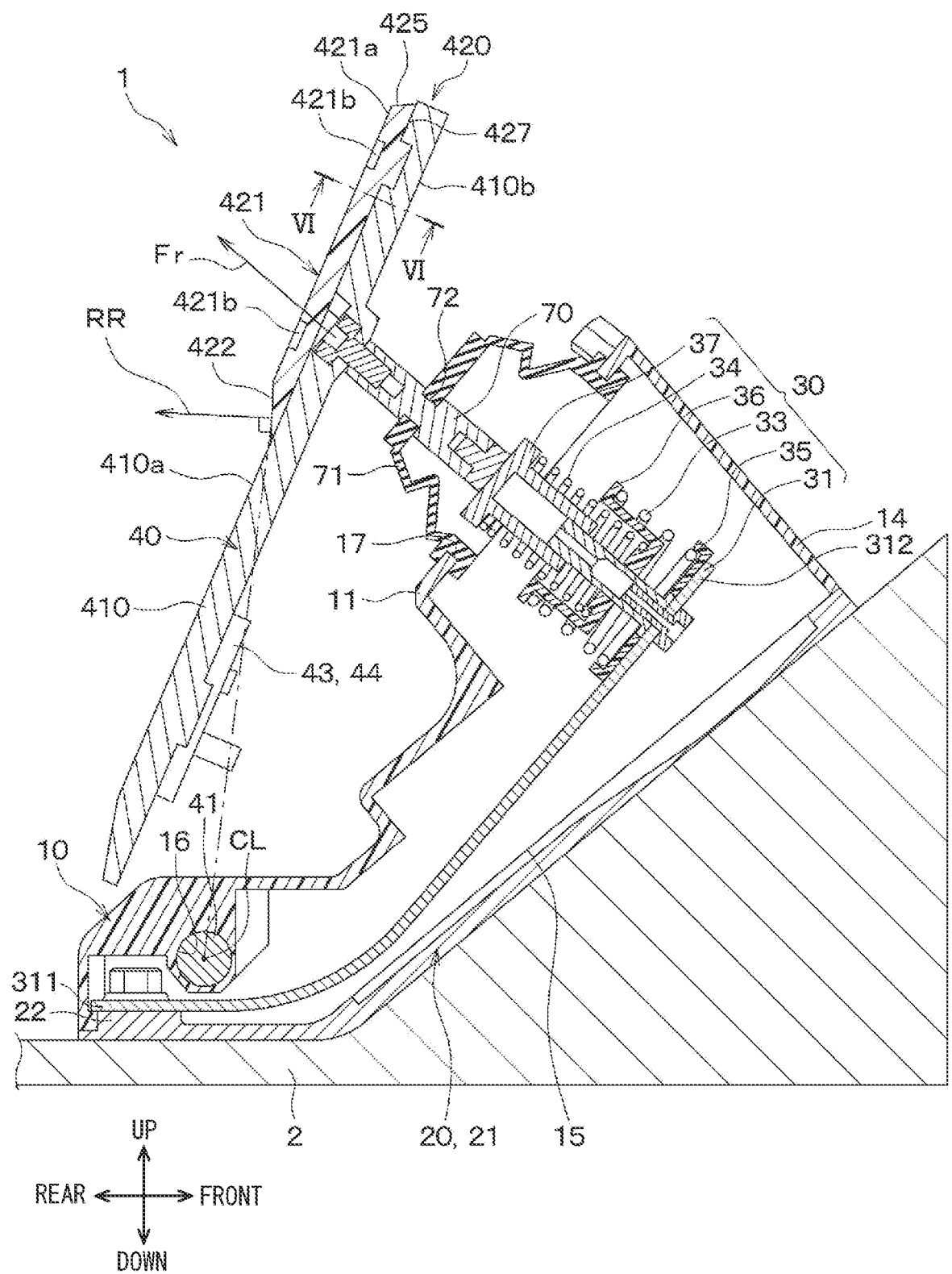
FIG. 4 is a cross-sectional view perpendicular to an axis of rotation of a pedal pad in the brake pedal device.

As shown in FIGS. 2, 3, and 4, the brake pedal device 1 includes a first housing 10, a second housing 20, a reaction force generation mechanism 30, the pedal pad 40, the sensor unit 50, or the like.

The first housing 10 is a member that holds or covers at least one of a rotation shaft 41 of the pedal pad 40, the sensor unit 50 and the reaction force generation mechanism 30. The first housing 10 of the present embodiment is made of resin, for example. The first housing 10 is shaped like a box having a top wall 11, a left sidewall 12, a right sidewall 13, a front wall 14, or the like. A space for arranging the sensor unit 50, the reaction force generation mechanism 30, or the like is provided inside the first housing 10 of the present embodiment.

The first housing 10 has an opening 15 into which the reaction force generation mechanism 30 can be inserted on a vehicle body side where the brake pedal device 1 is installed. The opening 15 is closed by the second housing 20. Thus, the first housing 10 of the present embodiment covers the reaction force generation mechanism 30 together with the second housing 20.

Further, the first housing 10 of the present embodiment has a cylindrical bearing portion 16 that is provided on the rotation axis CL of the pedal pad 40 and rotatably supports the rotation shaft 41. The rotation shaft 41 of the pedal pad 40 is a columnar shaft rotatably provided in the bearing portion 16. The sensor unit 50 for detecting a rotation angle of the rotation shaft 41 is provided on or around the rotation axis CL of the rotation shaft 41 of the pedal pad 40. Thus, the first housing 10 holds and covers the rotation shaft 41 of the pedal pad 40 and a part of the sensor unit 50.

The sensor unit 50 is a circuit that directly detects the rotation angle of the rotation shaft 41 by being provided on or around the rotation axis CL of the rotation shaft 41. As the sensor unit 50, for example, it is possible to adopt a non-contact sensor circuit using a Hall IC or a magneto-resistive element, or a contact sensor circuit using a rotary encoder or the like.

Further, the sensor unit 50 also outputs a signal corresponding to the rotation angle of the rotation shaft 41 to the ECU 110 of the vehicle from a connector 51 provided outside the first housing 10. Note that the rotation angle of the rotation shaft 41 and the rotation angle of the pedal pad 40 (that is, the pedal operation amount) are the same.

The second housing 20 is provided on one side of the first housing 10 in the direction in which the pedal pad 40 rotates (that is, a pedal depression side). The second housing 20 is provided so as to close the opening 15 of the first housing 10. The first housing 10 and the second housing 20 may be fastened and fixed, for example, by screws or the like, or may be fixed by other methods. The second housing 20 may be made of the same material as the first housing 10, or may be made of a different material (for example, metal).

The second housing 20 is arranged at a position between (i) a portion of the reaction force generation mechanism 30 opposite to the pedal pad 40 and (ii) the vehicle body. The second housing 20 supports a portion of the reaction force generation mechanism 30 opposite to the pedal pad 40. In the present embodiment, the portion of the reaction force generation mechanism 30 opposite to the pedal pad 40 corresponds to one end 311 of a leaf spring 31 of the reaction force generation mechanism 30. The second housing 20 is fixed to the floor 2 or dash panel of the vehicle with screws 61 or the like.

The pedal pad 40 is a member that is stepped on by the driver for braking operation and integrally rotates about the rotation axis CL, and has a pedal base portion 410 and a pedal operation portion 420. The pedal base portion 410 is an integrally formed plate-shaped member. The material forming the pedal base portion 410 may be metal, resin, or other materials.

The pedal base portion 410 is obliquely arranged with respect to the floor 2. Specifically, the pedal pad 40 is obliquely arranged such that its upper end is positioned on a vehicle front side and its lower end is positioned on a vehicle rear side. The pedal base portion 410 extends away from the rotation axis CL from one end on a rotation axis CL side to the other end. Plate surfaces of the pedal base portion 410 are arranged substantially parallel to a lateral direction of the vehicle. Therefore, of the plate surfaces of the pedal base portion 410, a bottom surface 410b faces the floor 2, and a top surface 410a faces the driver's seat. Note that the pedal pad 40 is not limited to such a posture, and may be arranged substantially perpendicular to the floor 2, for example.

A connection plate 43 is fixed by screwing or the like to a lower end side of an intermediate position, which is a position equidistant from the lower end and the upper end of the pedal base portion 410. Further, the reaction force generation mechanism 30 is connected to an upper end side of the intermediate position, which is a position equidistant from the lower end and the upper end of the pedal base portion 410. Further, the pedal operation portion 420 is fixed to a portion of the top surface 410a that is on an upper end side of the intermediate position which is equidistant from the lower end and the upper end of the top surface 410a.

The pedal operation portion 420 is a plate-shaped member integrally formed as a whole. In the present embodiment, the pedal operation portion 420 is made of resin, but may be made of other materials (for example, metal). In addition, being made of resin means containing resin as a main component.

Figure 5:
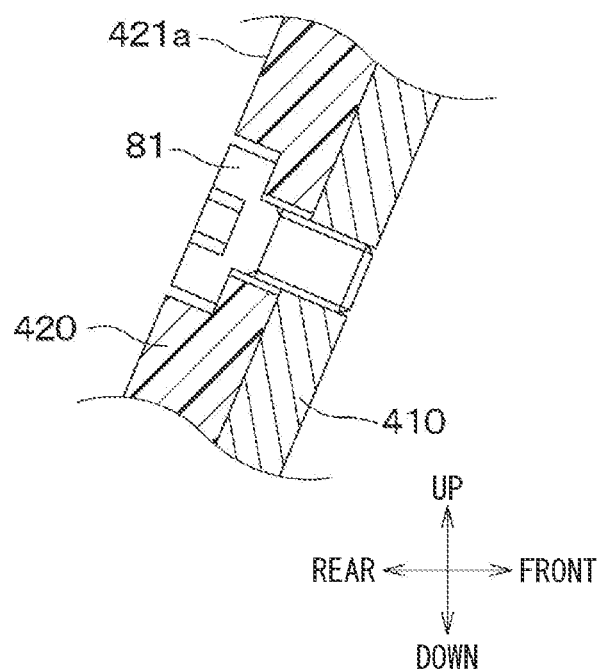
FIG. 5 is a cross-sectional view of the pedal pad in a cross-section including a screw.

As shown in FIGS. 2, 3, and 5, in the present embodiment, the pedal base portion 410 and the pedal operation portion 420 are fastened and fixed to each other by a plurality of screws 81 which are made as separate members from the pedal base portion 410 or the pedal operation portion 420.

The pedal operation portion 420 is arranged on a pedal return side of the pedal base portion 410 in a rotation direction of the pedal pad 40 about the rotation axis CL. Further, the pedal operation portion 420 protrudes toward the pedal return side with respect to the pedal base portion 410 which is another member of the pedal pad 40. The pedal return side refers to a direction in which the pedal pad 40 rotates when the driver's stepping on the pedal pad 40 is released.

Hereinafter, the pedal return side in the rotation direction of the pedal pad 40 about the rotation axis CL will simply be referred to as a pedal return side. Further, the pedal depression side in the rotation direction of the pedal pad 40 about the rotation axis CL is simply referred to as the pedal depression side. It should be noted that the depression side refers to a direction in which the pedal pad 40 rotates as the driver steps on the pedal pad 40.

The pedal operation portion 420 has a surface and a substance portion surrounded by the surface. The surface has a foot-receiving portion 421 facing the driver's seat, a back surface portion 427 facing the pedal base portion 410, and a plurality of side surfaces connecting a peripheral edge of the foot-receiving portion 421 and a peripheral edge of the back surface portion 427. The plurality of side surfaces includes a first side surface 422, a second side surface 423, a third side surface 424 and a fourth side surface 425.

The foot-receiving portion 421 is a substantially rectangular surface, and is a portion that is stepped on by the driver during a braking operation and comes into contact with a bottom surface, or a sole, of a driver's shoe. The foot-receiving portion 421 has a plane portion 421a made of a flat plane and a plurality of anti-slip portions 421b.

The plane portion 421a is a portion of the foot-receiving portion 421 that mainly comes into contact with the sole of the driver's shoe. The plane portion 421a is configured as a flat surface as a whole. Here, the plane includes not only a perfect plane but also a plane having a sufficiently large radius of curvature (for example, a radius of curvature of 250 mm or more). Due to the presence of the plane portion 421a, when the driver steps on the pedal operation portion 420 for a braking operation, a part of the sole of the shoe comes into contact with the relatively flat, plane portion 421a, thereby stably acting the stepping force of the driver on the pedal pad 40.

The plurality of anti-slip portions 421b are arranged apart from each other while being surrounded by the plane portion 421a. Each of these anti-slip portions 421b is formed in a recessed shape that is recessed in a direction toward the back surface portion 427 with respect to the plane portion 421a. That is, the anti-slip portion 421b has a concave portion formed in a concave shape. This concave shape increases a frictional force between the sole of the shoe and the foot-receiving portion 421 when the sole of the shoe contacts the plane portion 421a and the anti-slip portion 421b.

The back surface portion 427 faces an opposite side of the foot-receiving portion 421 and faces the top surface 410a of the pedal base portion 410 and is fixed to the top surface 410a.

The first side surface 422 is a surface that extends from an edge of the foot-receiving portion 421 on a lower side of the vehicle in the vertical direction to an edge of the back surface portion 427 on the lower side of the vehicle in the vertical direction. That is, the first side surface 422 is a side surface of the pedal operation portion 420 on the rear side of the vehicle, and is a side surface of the pedal operation portion 420 that is closest to the rotation axis CL. Further, as shown in FIGS. 2 and 4, the first side surface 422 is inclined away from the rotation axis CL toward a pedal return side RR.

Figure 6:
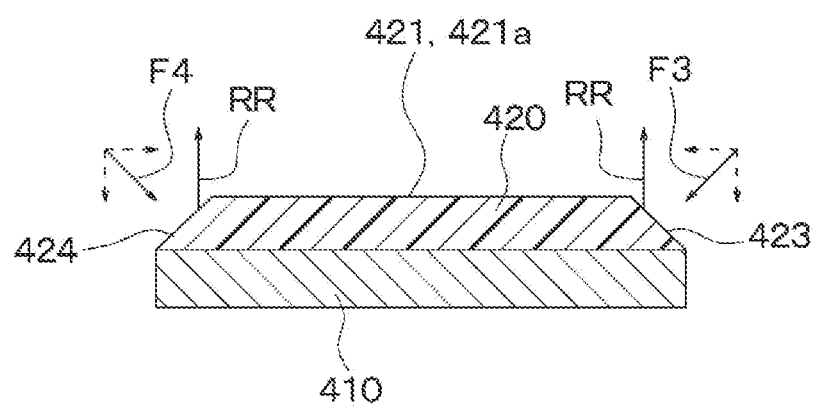
FIG. 6 is a cross-sectional view taken along a line VI-VI of FIG. 4.

The second side surface 423 extends from a right edge of the foot-receiving portion 421 in the lateral direction of the vehicle to a right edge of the back surface portion 427 in the lateral direction of the vehicle. That is, the second side surface 423 is a right side surface of the pedal operation portion 420 in the lateral direction of the vehicle. As shown in FIGS. 2 and 6, the second side surface 423 on the right side in the lateral direction of the vehicle is inclined toward the left side in the lateral direction of the vehicle when extending toward the pedal return side RR. Here, the right side and the left side in the lateral direction of the vehicle correspond to one side and the other side in the lateral direction of the vehicle, respectively.

The third side surface 424 extends from a left edge of the foot-receiving portion 421 in the lateral direction of the vehicle to a left edge of the back surface portion 427 in the lateral direction of the vehicle. That is, the second side surface 423 is a left side surface of the pedal operation portion 420 in the lateral direction of the vehicle. As shown in FIGS. 3 and 6, the third side surface 424 on the left side in the lateral direction of the vehicle is inclined toward the right side in the lateral direction of the vehicle when extending toward the pedal return side RR. Here, the right side and the left side in the lateral direction of the vehicle correspond to the other side and the one side in the lateral direction of the vehicle, respectively.

The fourth side surface 425 is a surface that extends from an edge of the foot-receiving portion 421 on a top side of the vehicle in the vertical direction to an edge of the back surface portion 427 on the top side of the vehicle in the vertical direction. That is, the fourth side surface 425 is a side surface of the pedal operation portion 420 on the front side of the vehicle.

Each of the first side surface 422, the second side surface 423, the third side surface 424, and the fourth side surface 425 has a substantially flat shape, but may also have a shape other than the flat shape (for example, a concave shape, a convex shape, or a wavy shape).

Due to the inclination of the first side surface 422 and the fourth side surface 425, the substance portion of the pedal operation portion 420 has a tapered shape that tapers a width in the radial direction about the rotation axis CL toward a pedal return direction. Similarly, due to the inclination of the second side surface 423 and the third side surface 424, the substance portion of the pedal operation portion 420 has a tapered shape that tapers a width in the lateral direction of the vehicle toward the pedal return direction.

A connecting plate 43 is provided on a back surface of the pedal pad 40. The connecting plate 43 integrally has a back plate portion 44 fixed to the back surface of the pedal pad 40 and a side plate portion 45 provided substantially perpendicular to the back plate portion 44. The side plate portion 45 of the connecting plate 43 is fixed to the rotation shaft 41.

As described above, the rotation shaft 41 is rotatably supported by the bearing portion 16 of the first housing 10. Therefore, when the pedal pad 40 is stepped on by the driver's foot, the pedal pad 40 is rotatable about the rotation axis CL of the rotation shaft 41 by a predetermined angle within a range, i.e., in a forward direction (that is, the pedal depression side) and in a backward direction (that is, the pedal return side).

The reaction force generation mechanism 30 is a mechanism that generates a reaction force corresponding to the amount of stepping of the pedal pad 40 caused by the stepping force of the driver applied thereto. Since the brake pedal device 1 is provided with the reaction force generation mechanism 30, even if the mechanical connection between the pedal pad 40 and the master cylinder 126 is eliminated as in the present embodiment, the reaction force similar to that of the conventional brake system can be generated and obtained.

The conventional brake system refers to a configuration in which a master cylinder and a pedal pad are mechanically connected, and the pedal pad receives reaction force from the master cylinder due to hydraulic pressure. In the present embodiment, the pedal pad 40 does not have an application of a reaction force that is mechanically transmitted from the master cylinder by hydraulic pressure.

In the present embodiment, the reaction force generation mechanism 30 has a plurality of elastic members. Specifically, the reaction force generation mechanism 30 has the leaf spring 31, a large-diameter coil spring 33, a small-diameter coil spring 34, a lower holder 35, a spring seat 36, and an upper holder 37 as a plurality of elastic members. By configuring the reaction force generation mechanism 30 to have a plurality of elastic members, the reaction force of the reaction force generation mechanism 30 can be changed in multiple steps with respect to changes in the rotation angle of the pedal pad 40 (that is, the amount of pedal operation). As a result, the reaction force generation mechanism 30 can reproduce the multistage reaction force characteristics that are unique to conventional brake systems.

Each of the leaf spring 31, the large-diameter coil spring 33, and the small-diameter coil spring 34 is made of steel materials. Being made of steel materials means that it mainly contains steel materials. Further, carbon content of the steel materials is 0.1% by weight or more. Alternatively, only one or two of the leaf spring 31, the large-diameter coil spring 33, and the small-diameter coil spring 34 may be made of steel materials as a main component, and carbon content of the steel materials may be 0.1% by weight or more. Also, the leaf spring 31, the large-diameter coil spring 33, and the small-diameter coil spring 34 may be made of other metals.

The leaf spring 31 is bent to form a convex curved surface toward the floor 2 when not receiving a load. One end 311 of the leaf spring 31 (that is, an end of the reaction force generation mechanism 30 opposite to the pedal pad 40) is arranged at a position between the rotation shaft 41 of the pedal pad 40 and the second housing 20. One end 311 of the leaf spring 31 is fixed to a portion 22 of the second housing 20 that supports the reaction force generation mechanism 30.

On the other hand, the other end 312 of the leaf spring 31 is provided with the lower holder 35, the large-diameter coil spring 33, the spring seat 36, the small-diameter coil spring 34, the upper holder 37, the connecting rod 70, or the like in this written order. The lower holder 35 is fixed to the other end 312 of the leaf spring 31. The large-diameter coil spring 33 has an end on a side of the leaf spring 31 supported by the lower holder 35 and an end on a side of the pedal pad 40 supported by the spring seat 36. The small-diameter coil spring 34 is supported by the spring seat 36 at an end on a side of the leaf spring 31 and supported by the upper holder 37 at an end on a side of the pedal pad 40.

The bar-shaped connecting rod 70 is fixed to the pedal base portion 410 at an end on a side of the pedal pad 40, and slidably contacts the upper holder 37 at an end on a side of the leaf spring 31. Note that the connecting rod 70 may be configured such that the end on the pedal pad 40 side is swingably connected to the pedal base portion 410, and the end on the leaf spring 31 side is swingably connected to the upper holder 37. The connecting rod 70 may be configured as a combination of a plurality of members, or may be integrally formed as one body.

Further, a portion where the connecting rod 70 and the pedal base portion 410 are connected and the plane portion 421a overlap in the rotation direction. Here, the rotation direction is a rotation direction of the pedal pad 40 about the rotation axis CL. Further, a virtual extension line extending from an end on a side of the pedal pad 40 of the connecting rod 70 toward the pedal operation portion 420 along the extending direction of the connecting rod 70 pierces the plane portion 421a.

Furthermore, as shown in FIG. 3, the connecting rod 70 and the pedal base portion 410 and the anti-slip portion 421b may overlap in the rotation direction. In such configuration, an anti-slip effect is enhanced. However, as another example, the portion where the connecting rod 70 and the pedal base portion 410 are connected and the anti-slip portion 421b may be not configured to overlap in the rotation direction.

A virtual extension line extending from an end on a side of the pedal pad 40 of the connecting rod 70 toward the pedal operation portion 420 along the extension direction of the connecting rod 70 may pierces through the anti-slip portion 421b. In such configuration, an anti-slip effect is enhanced. However, as another example, it does not have to be piercing.

The connecting rod 70 is inserted through an upper opening 17 provided in the first housing 10. The upper opening 17 is sized to allow an insertion of the small-diameter coil spring 34 and the upper holder 37.

With this configuration, when the driver applies a stepping force to the pedal operation portion 420 of the pedal pad 40 and the pedal pad 40 rotates toward the first housing 10 and the second housing 20, a load is applied to each member of the reaction force generation mechanism 30 from the pedal pad 40 via the connecting rod 70. Therefore, the leaf spring 31, the large-diameter coil spring 33, and the small-diameter coil spring 34, which constitute the reaction force generation mechanism 30, bend according to their respective spring constants, and generate a reaction force against the stepping force applied to the pedal pad 40 by the driver.

Specifically, when a load is applied to each member of the reaction force generation mechanism 30 from the pedal pad 40 via the connecting rod 70, the large-diameter coil spring 33 and the small-diameter coil spring 34 bend in their spring axial directions. Further, the leaf spring 31 bends so that a portion on an other end 312 side thereof where the lower holder 35 is fixed approaches the second housing 20. As a result, an elastic force due to the bending of the leaf spring 31, the large-diameter coil spring 33, and the small-diameter coil spring 34 is transmitted to the pedal base portion 410 via the connecting rod 70.

At this time, since an extending direction of the connecting rod 70 and a connection position between the connecting rod 70 and the pedal base portion 410 are configured as described above, a reaction force vector Fr transmitted from the connecting rod 70 to the pedal base portion 410 pierces the plane portion 421a. At this time, the reaction force vector Fr may pierce the anti-slip portion 421b. In the present embodiment, the reaction force vector Fr pierces the plane portion 421a at any rotation angle of the pedal pad 40, i.e., from an angle at an initial position when the driver's stepping force is not applied thereto to a maximum angle when the pedal pad 40 is stepped on up to an extreme. However, as another example, the reaction force vector Fr may be configured to pierce the plane portion 421a only in a partial angle range between the angle at the initial position and the maximum angle (for example, a partial angular range including the angle at the initial position).

The configurations of the reaction force generation mechanism 30 and the connecting rod 70 are not limited to those illustrated above, and various configurations can further be adopted.

A covering member 71 is provided around the connecting rod 70. The covering member 71 is made of rubber, for example, and is formed in a cylindrical and bellows shape. One end of the cylindrical shape of the covering member 71 is fitted into a groove 72 provided in the middle of the connecting rod 70, and the other end of the cylindrical shape is fitted into the upper opening 17 of the first housing 10. The covering member 71 prevents foreign substances, water, or the like from entering the inside of the first housing 10 through the upper opening 17 of the first housing 10.

The brake pedal device 1 shown in FIGS. 2 to 6 is in an initial state in which the stepping force of the driver is not applied to the pedal pad 40 (that is, the pedal pad 40 is at the initial position). The initial position of the pedal pad 40 is regulated by a full-close stopper (not shown). Unless otherwise stated, the positional relationships described in the present embodiment and other embodiments are established in this initial state, and in any rotation position between the initial position and the maximum rotation position (or in some positions in between).

In the brake pedal device 1, when the stepping force of the driver is applied to the pedal pad 40, the pedal pad 40 rotates about the rotation axis CL of the rotation shaft 41, and the upper portion of the pedal pad 40 with respect to the rotation axis CL in the vehicle moves toward the floor 2 or toward the dash panel. At this time, the sensor unit 50 outputs a signal corresponding to the rotation angle of the rotation shaft 41 (that is, the rotation angle of the pedal pad 40) to the ECU 110 of the vehicle. The ECU 110 drives and controls the brake circuit 120 to generate hydraulic pressure required for braking the vehicle, and the hydraulic pressure drives the brake pads to decelerate or stop the vehicle.

As described above, when the driver performs a braking operation, the reaction force vector Fr of the reaction force that is generated by the reaction force generation mechanism 30 pierces the plane portion 421*a* of the pedal pad 40, on which the stepping force of the driver by the braking operation stably acts. Therefore, the amount of divergence between the position where the stepping force acts on the pedal operation portion 420 and the position where the reaction force acts on the pedal pad 40 is reducible. As a result, the possibility of unnecessary bending stress being applied to the pedal pad 40 is reducible.

(1) Further, the portion where the connecting rod 70 and the pedal base portion 410 are connected and the plane portion 421*a* overlap in the rotation direction about the rotation axis CL. In such configuration, it is possible to structurally realize a reaction force acting along a direction piercing the plane portion 421*a*.

(2) In addition, the foot-receiving portion 421 of the pedal operation portion 420 is provided with the anti-slip portion 421*b*. Such an anti-slip portion 421*b* allows a stable stepping force to be applied to the pedal operation portion 420.

(3) In addition, the anti-slip portion 421*b* has a concave portion that has a concave shape with respect to the plane portion 421*a*. In such configuration, anti-slipping character can be realized by the shape.

(4) Further, the pedal operation portion 420 includes a resin material. In such configuration, the weight of the brake pedal device 1 can be easily reduced.

(5) Each of the second side surface 423 and the third side surface 424, which are side surfaces on one/other sides in the lateral direction of the vehicle of the pedal operation portion 420, is inclined toward the other side in the lateral direction of the vehicle as the side surfaces 423, 424 extend toward the pedal return side RR.

In such configuration, when a stepping force is applied from one side in the lateral direction of the vehicle, the side surface on one side in the lateral direction of the vehicle receives the stepping force while being inclined with respect to the lateral direction of the vehicle. Therefore, a component of the force in the lateral direction of the vehicle is reducible compared to when the stepping force is received in the lateral direction of the vehicle.

For example, when a stepping force is applied from the right side in the lateral direction of the vehicle, as shown in FIG. 6, the second side surface 423 receives the stepping force in a direction F3 inclined with respect to the lateral direction of the vehicle. Therefore, the stepping force is split into a component directed toward pedal depression side and a component directed leftward in the lateral direction of the vehicle, as indicated by dashed arrows.

Further, for example, when a stepping force is applied from the left side in the lateral direction of the vehicle, as shown in FIG. 6, the third side surface 424 receives the stepping force in a direction F4 inclined with respect to the lateral direction of the vehicle. Therefore, the stepping force is split into a component directed toward the pedal depression side and a component directed rightward in the lateral direction of the vehicle, as indicated by dashed arrows.

(6) The first side surface 422 of the pedal operation portion 420 on the driver's side is inclined away from the rotation axis CL toward the pedal return side RR.

In such manner, since the first side surface 422 is inclined to ward off a force of a kick when the pedal operation unit 420 is kicked upward from the lower side in the vertical direction of the vehicle, a force applied thereto when kicked can be reduced.

(7) Further, the pedal base portion 410 and the pedal operation portion 420 are configured as separate parts. In such configuration, the same pedal base portion 410 is usable in various types of vehicles. For example, even when changing an inclination angle of the pedal operation portion 420 with respect to the pedal base portion 410 depending on the type of the vehicle, such a change can be accommodated only the change of one component, i.e., the pedal operation portion 420.

(8) Further, the pedal operation portion 420 is fastened to the pedal base portion 410 with screws. In such configuration, the pedal operation portion 420 can be removed from the pedal base portion 410 as required.

(9) The reaction force generation mechanism 30 has the leaf spring 31, the large-diameter coil spring 33, and the small-diameter coil spring 34 made of steel materials. Coil springs or leaf springs made of steel materials are less affected by changes in temperature and humidity on their elastic force than rubber or compressible fluids, thereby stable stepping force characteristics can be realized.

(10) In the reaction force generation mechanism 30, at least part of the members that generate an elastic force as reaction force (that is, the leaf spring 31, the large-diameter coil spring 33, and the small-diameter coil spring 34) include steel materials, and carbon content of the steel materials is 0.1% by weight or more. By configuring the part in such manner, the reaction force generation mechanism 30 can easily generate a reaction force equivalent to that of a conventional hydraulic brake while maintaining a small physique. In addition, it is possible to easily provide the brake pedal device 1 that does not make the brake operation uncomfortable.

(11) Further, the brake pedal device 1 is applied to a brake system including the brake calipers 131 to 134, the electric motor 123, and the first ECU 111. The brake calipers 131 to 134 generate a braking force by pressing the brake pads against the brake disc with a force corresponding to the hydraulic pressure. The electric motor 123 adjusts hydraulic pressure to the brake calipers 131 to 134. The first ECU 111 controls the electric motor 123 based on an input signal. The sensor unit 50 then outputs a signal corresponding to the rotation angle of the pedal pad 40 to the first ECU 111. That is, so-called brake-by-wire is realized.

In order to connect the master cylinder and the organ-type brake pedal in a hydraulic brake system, the master cylinder must be tilted forward, which is difficult in terms of vehicle space. However, by-wiring of the brake system makes it easy to implement the master cylinder 126 to the vehicle.

(12) The reaction force generation mechanism 30 is covered by the first housing 10 and the second housing 20, and the force transmitted by the hydraulic pressure is not applied to the pedal pad 40 as a reaction force, and the reaction force is generated and applied by the reaction force generation mechanism 30. By introducing the reaction force generation mechanism 30 in such manner, when the driver switches from a vehicle equipped with a conventional hydraulic brake system to a vehicle equipped with the brake system 100 of the present embodiment, the driver's discomfort regarding the brake operation otherwise caused by the switch of the vehicle is reducible.

Second Embodiment

Figure 7:
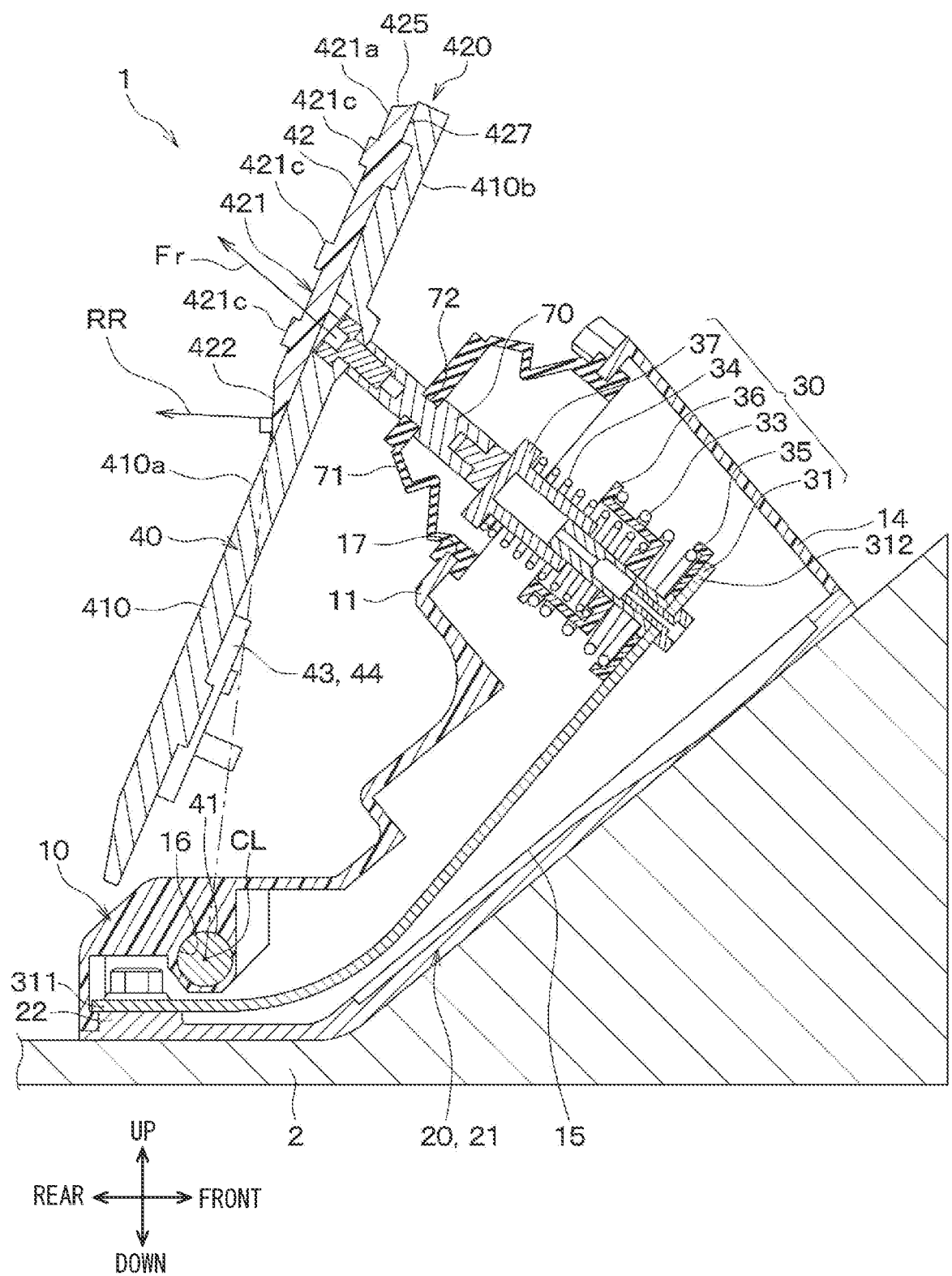
FIG. 7 is a cross-sectional view perpendicular to an axis of rotation of a pedal pad in a brake pedal device according to a second embodiment.

Next, the second embodiment will be described with reference to FIG. 7. In the present embodiment, the plurality of anti-slip portions 421*b* of the above-described first embodiments are replaced with a plurality of anti-slip portions 421*c* in contrast to the first embodiment. Other than the above, the present embodiment is the same as the first embodiment.

The plurality of anti-slip portions 421*c* are arranged apart from each other while being surrounded by a plane portion 421*a*. Each of the anti-slip portions 421*c* is formed in a convex shape protruding toward the pedal return side with respect to the plane portion 421*a*. That is, the anti-slip portion 421*c* has a convex portion formed in a convex shape. This convex shape increases the frictional force between the sole of the shoe and a foot-receiving portion 421 when the sole of the shoe contacts the plane portion 421*a* and the anti-slip portion 421*c*.

These anti-slip portions 421*c* may be formed integrally with other portions of a pedal operation portion 420, or may be formed separately from the other portions of the pedal operation portion 420.

Further, the portion where a connecting rod 70 and a pedal base portion 410 are connected and the anti-slip portion 421*c* may overlap in the rotation direction. In such configuration, an anti-slip effect is enhanced. However, as another example, the portion where the connecting rod 70 and the pedal base portion 410 are connected and the anti-slip portion 421*c* may be configured not to overlap in the rotation direction.

Further, a virtual extension line extending from an end on a side of a pedal pad 40 of the connecting rod 70 toward the pedal operation portion 420 along the extension direction of the connecting rod 70 may pierce the anti-slip portion 421*c*. In such configuration, an anti-slip effect is enhanced. However, as another example, it does not have to be piercing.

(1) As described above, the anti-slip portion 421*c* has a convex portion that is convex with respect to the plane portion 421*a*. In such configuration, anti-slipping character can be realized by the shape. Also, in the present embodiment, the same or corresponding effects can be obtained from the same or corresponding configuration as those of the first embodiment.

Third Embodiment

Figure 8:
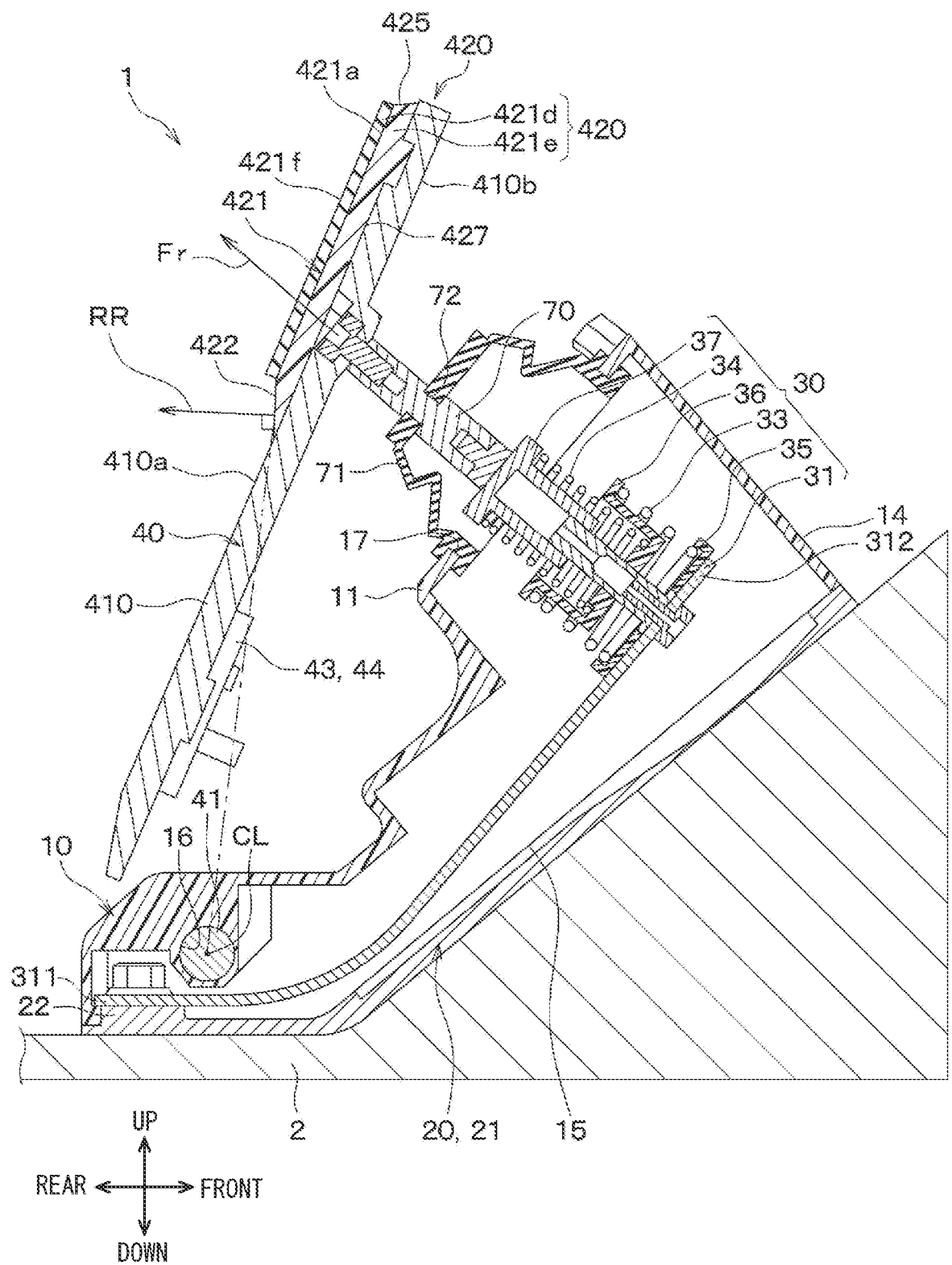
FIG. 8 is a cross-sectional view perpendicular to an axis of rotation of a pedal pad in a brake pedal device according to a third embodiment.

Next, the third embodiment is described using FIG. 8. In the present embodiment, the anti-slip portion 421*b* is eliminated from the first embodiment, and an anti-slip portion 421*d* is added to the first embodiment.

In the present embodiment, as a part of a pedal operation portion 420, the anti-slip portion 421*d* is provided. Hereinafter, a part of the pedal operation portion 420 other than the anti-slip portion 421*d* and between the anti-slip portion 421*d* and a pedal base portion 410 is referred to as an intermediate portion 421*e*.

The configuration of the intermediate portion 421*e* is the same as that of the pedal operation portion 420 of the first embodiment. However, as shown in FIG. 8, the intermediate portion 421*e* may be the pedal operation portion 420 of the first embodiment with the anti-slip portion 421*b* removed therefrom.

The anti-slip portion 421*d* is made of a rubber material. Being made of a rubber material means that it mainly contains a rubber material. The anti-slip portion 421*d* is arranged to cover the foot-receiving portion 421 of the intermediate portion 421*e*. The anti-slip portion 421*d* has a membrane shape, of which one surface is fixed to the foot-receiving portion 421, and an other surface 421*f* faces the pedal return side. The surface 421*f* has a flat portion configured as a flat plane. For example, the entire surface 421*f* may be a flat portion, or a part of the surface 421*f* may be a flat portion.

This flat portion is generally a flat plane when not stepped on by the driver. Here, the flat plane includes not only a perfect flat plane but also a flat plane having a sufficiently large radius of curvature (for example, a radius of curvature of 250 mm or more).

In addition, the anti-slip portion 421*d* of the present embodiment may or may not cover a first side surface 422, a second side surface 423, a third side surface 424, and a fourth side surface 425. Also, some of these may be covered by the anti-slip portion 421*d*, and the rest may be not covered by the anti-slip portion 421*d*.

Also, the portion where a connecting rod 70 and the pedal base portion 410 are connected and the flat portion of the surface 421*f* overlap in the rotation direction. Further, a virtual extension line extending from an end on a side of the pedal pad 40 of the connecting rod 70 toward the pedal operation portion 420 along the extension direction of the connecting rod 70 pierces the flat portion of the surface 421*f*. Furthermore, the portion where the connecting rod 70 and the pedal base portion 410 are connected and the anti-slip portion 421*d* overlap in the rotation direction. A virtual extension line extending from an end on a side of the pedal pad 40 of the connecting rod 70 toward the pedal operation portion 420 along the extending direction of the connecting rod 70 pierces the anti-slip portion 421*d*.

Therefore, when the driver performs a braking operation, a reaction force vector Fr of the reaction force, generated by a reaction force generation mechanism 30, is applied in a direction penetrating through the flat portion of the surface 421*f* on which the stepping force of the driver by the braking operation stably acts. Thus, the amount of divergence between the position where the stepping force acts on the pedal operation portion 420 and the position where the reaction force acts on the pedal pad 40 is reducible. As a result, the possibility of unnecessary bending stress being applied to the pedal pad 40 is reducible.

(1) In addition, since the anti-slip portion 421*d* includes a rubber material, it is possible to achieve anti-slipping character due to the use of such material. Also, in the present embodiment, the same or corresponding effects can be obtained from the same or corresponding configuration as those of the first embodiment.

Fourth Embodiment

Figure 9:
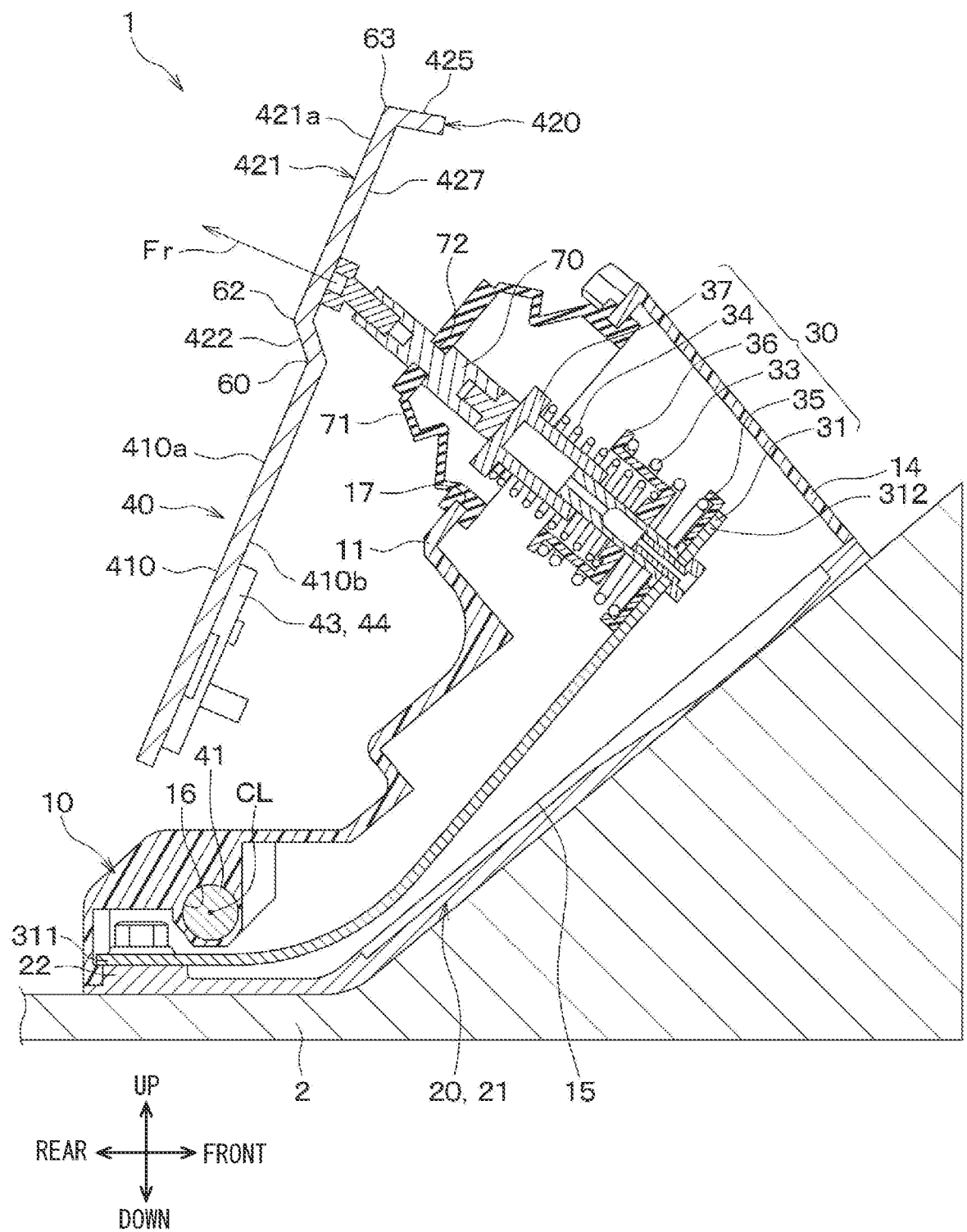
FIG. 9 is a cross-sectional view perpendicular to an axis of rotation of a pedal pad in a brake pedal device according to a fourth embodiment.

Next, the fourth embodiment will be described with reference to FIG. 9. In the present embodiment, the configuration of a pedal pad 40 is changed from the first to third embodiments. Other configurations are similar to those of the first to third embodiments.

In the pedal pad 40 of the first to third embodiments, the pedal base portion 410 and the pedal operation portion 420 are formed separately. In contrast, in the present embodiment, a pedal base portion 410 and a pedal operation portion 420 are integrally formed.

More specifically, the pedal base portion 410 and the pedal operation portion 420 are formed of a single plate having a constant thickness and by press work. However, as another example, it may be formed by processing other than press work. The pedal base portion 410 and the pedal operation portion 420 may both be made of metal, or may both be made of resin, for example.

In the present embodiment, a portion of the pedal pad 40 that is closer to a rotation axis CL and is flat is the pedal base portion 410. Further, the pedal operation portion 420 is connected to a far side end of the pedal base portion 410 away from the rotation axis CL. The pedal operation portion 420 is bent toward the pedal return side with respect to the pedal base portion 410 at a connection portion 60, and is further bent toward the pedal depression side at a bent portion 62 extending further away from the rotation axis CL. Further, the pedal operation portion 420 is further bent toward the pedal depression side at a bent portion 63 extending further away from the rotation axis CL, from the bent portion 62. Since the pedal operation portion 420 is bent in such manner, the pedal operation portion 420 has a shape that protrudes toward the pedal return side with respect to the pedal base portion 410.

Of the surface on the pedal return side of the pedal operation portion 420, a portion from the connection portion 60 to the bent portion 62 is a first side surface 422, and a portion from the bent portion 62 to the bent portion 63 is a foot-receiving portion 421. Further, a portion from the bent portion 63 to the end portion of the pedal operation portion 420 on one side opposite to the pedal base portion 410 serves as a fourth side surface 425.

The foot-receiving portion 421 has a plane portion 421a. Here, the flat plane includes not only a perfect flat plane but also a flat plane having a sufficiently large radius of curvature (for example, a radius of curvature of 250 mm or more). The foot-receiving portion 421 may entirely be the plane portion 421a, or a part thereof may be the plane portion 421a. Also, the first side surface 422 is inclined away from the rotation axis CL toward the pedal return side.

(1) As described above, in the present embodiment, the pedal base portion 410 and the pedal operation portion 420 are formed of a single plate. In such configuration, the number of parts of the pedal pad 40 is reducible compared to the case where the pedal base portion 410 and the pedal operation portion 420 are made as separate members. Note that the pedal pad 40 may be made of only one plate that constitutes the pedal base portion 410 and the pedal operation portion 420. Alternatively, the pedal pad 40 may be made of (i) one plate constituting the pedal base portion 410 and the pedal operation portion 420, and (ii) other member (s). Also, in the present embodiment, the same or corresponding effects can be obtained from the same or corresponding configuration as those of the first embodiment.

Fifth Embodiment

Figure 10:
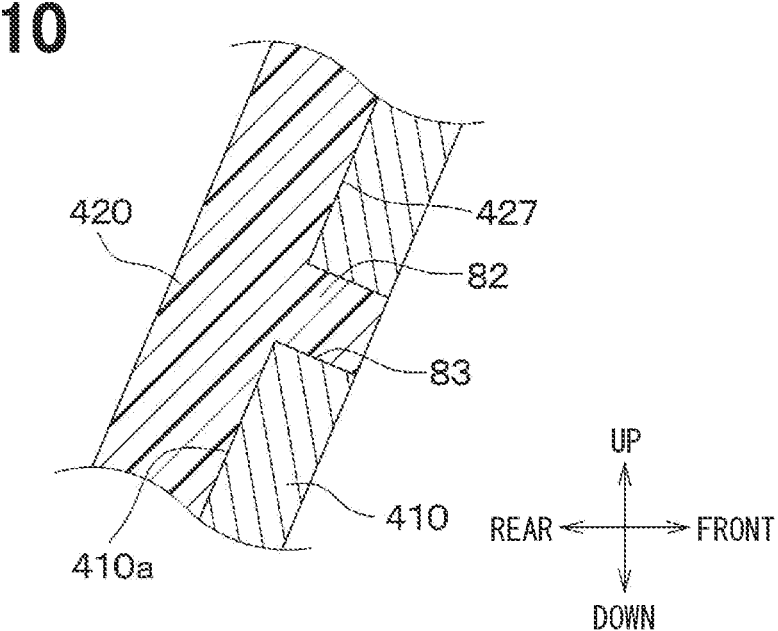
FIG. 10 is a cross-sectional view of a pedal pad in a cross-section including a screw according to a fifth embodiment.

Next, the fifth embodiment is described using FIG. 10. The present embodiment differs from the first to third embodiments in this point in which a pedal base portion 410 and a pedal operation portion 420 are assembled. Other configurations are similar to those of the first to third embodiments.

In the first to third embodiments, the pedal operation portion 420 is fastened and fixed to the pedal base portion 410 by a plurality of screws 81 formed as separate members from both of the pedal base portion 410 and the pedal operation portion 420.

In contrast, in the present embodiment, the screw 81 is eliminated and the pedal operation portion 420 is fixed to the pedal base portion 410 by press fitting. Specifically, a brake pedal device 1 has one or more protruding portions 82 protruding from a back surface portion 427 of the pedal operation portion 420 toward the pedal base portion 410. Each protruding portion 82 is formed integrally with the pedal operation portion 420.

Further, one or more receiving holes 83 are formed in the pedal base portion 410 at positions corresponding to the protruding portions 82. Each of the protruding portions 82 is press-fitted into the corresponding receiving hole 83. The press fitting fixes the pedal base portion 410 and the pedal operation portion 420 to each other.

Since each of the protruding portions 82 is press-fitted into each of the receiving holes 83 in such manner, parts other than the pedal operation portion 420 and the pedal base portion 410 are not required in order to fix the pedal operation portion 420 and the pedal base portion 410 together. Also, in the present embodiment, the same or corresponding effects can be obtained from the same or corresponding configuration as those of the first embodiment.

As another example, each of the protruding portions 82 may protrude from a top surface 410a of the pedal base portion 410 toward the pedal operation portion 420, and may be formed integrally with the pedal base portion 410. In such case, the receiving hole 83 is formed in the pedal operation portion 420 at a position corresponding to the protruding portion 82. By press-fitting the protruding portion 82 into the receiving hole 83, the pedal base portion 410 and the pedal operation portion 420 are fixed to each other. Similar effects can be obtained in such case as well.

Sixth Embodiment

Figure 11:
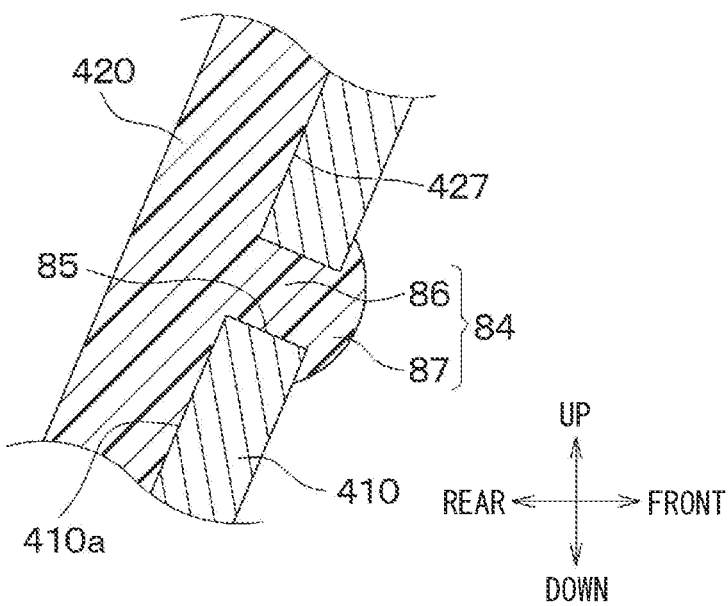
FIG. 11 is a cross-sectional view of a pedal pad in a cross-section including a screw according to a sixth embodiment.

Next, the sixth embodiment is described using FIG. 11. The present embodiment differs from the first to third embodiments in the manner in which a pedal base portion 410 and a pedal operation portion 420 are assembled. Other configurations are similar to those of the first to third embodiments.

In the first to third embodiments, the pedal operation portion 420 is fastened and fixed to the pedal base portion 410 by a plurality of screws 81 formed as separate members from both the pedal base portion 410 and the pedal operation portion 420.

In contrast, in the present embodiment, a screw 81 is eliminated, and the pedal operation portion 420 is fixed to the pedal base portion 410 by caulking. Specifically, a brake pedal device 1 has one or more rivets 84 protruding from a back surface portion 427 of the pedal operation portion 420 toward the pedal base portion 410. Each of the rivets 84 is integrally formed with the pedal operation portion 420.

Further, one or more receiving holes 85 are formed in the pedal base portion 410 at positions corresponding to the rivets 84. Each of the rivets 84 includes a body part 86 connected to the pedal operation portion 420 and inserted into the corresponding receiving hole 85, and a head part 87 connected to the body part 86 and protruding away from the pedal operation portion 420 with respect to the receiving hole 85.

Each of the head part 87 is larger in diameter than the corresponding receiving hole 85 and cannot pierce the corresponding receiving hole 85. In such manner, the pedal base portion 410 and the pedal operation portion 420 are fixed to each other.

Such a structure is realized by caulking. In the caulking process, each rivet 84 is inserted into the corresponding receiving hole 85 when assembling the pedal base portion 410 and the pedal operation portion 420. After the insertion, a portion of the rivet 84 that protrudes from the receiving hole 85 on an opposite side to the pedal operation portion 420 is plastically deformed to make the diameter larger than that of the receiving hole 85.

The rivet 84 that realizes such a caulking structure fixes the pedal operation portion 420 and the pedal base portion 410 to each other. In such configuration, there is no need to provide a separate component for fixing the pedal operation portion 420 and the pedal base portion 410 together. Also, in the present embodiment, the same or corresponding effects can be obtained from the same or corresponding configuration as those of the first embodiment.

As another example, each of the rivets 84 may protrude from the top surface 410a of the pedal base portion 410 toward the pedal operation portion 420 and may be formed integrally with the pedal base portion 410. In such case, the receiving hole 85 is formed in the pedal operation portion 420 at a position corresponding to the rivet 84. Then, the body part 86 of the rivet 84 is inserted into the receiving hole 85, and the head part 87 of the rivet 84 on the opposite side of the pedal base portion 410 with respect to the receiving hole 85 has a larger diameter than the receiving hole 85. The rivet 84 fixes the pedal operation portion 420 and the pedal base portion 410 to each other. Similar effects can be obtained in such case as well.

Seventh Embodiment

Figure 12:
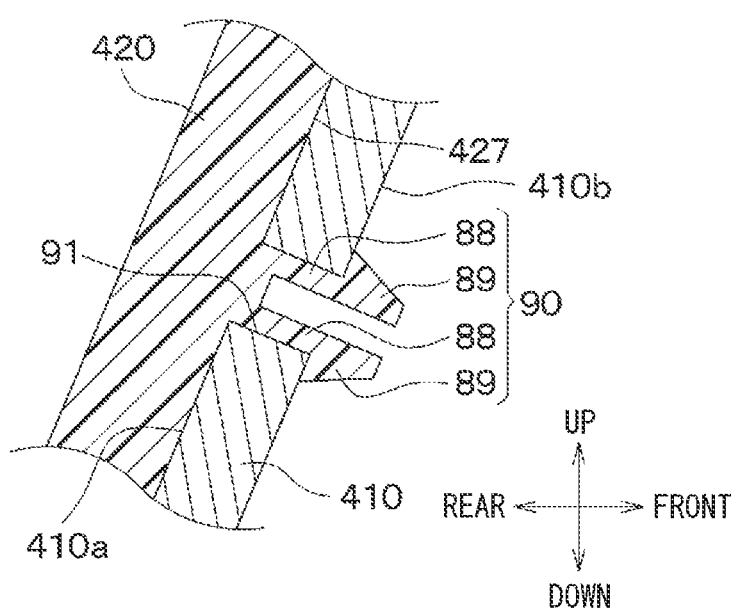
FIG. 12 is a cross-sectional view of a pedal pad in a cross-section including a screw according to a seventh embodiment.

Next, the seventh embodiment will be described with reference to FIG. 12. The present embodiment differs from the first to third embodiments in the manner in which a pedal base portion 410 and a pedal operation portion 420 are assembled. Other configurations are similar to those of the first to third embodiments.

In the first to third embodiments, the pedal operation portion 420 is fastened and fixed to the pedal base portion 410 by a plurality of screws 81 formed as separate members from both the pedal base portion 410 and the pedal operation portion 420.

In contrast, in the present embodiment, a screw 81 is eliminated and the pedal operation portion 420 is fixed to the pedal base portion 410 by snap-fitting. Specifically, a brake pedal device 1 has one or more engaging members 90 protruding from a back surface portion 427 of the pedal operation portion 420 toward the pedal base portion 410. Each of the engaging members 90 is formed integrally with the pedal operation portion 420.

One or more receiving holes 91 are formed in the pedal base portion 410 at positions corresponding to the engaging members 90. Each of the engaging members 90 includes: a plurality of rod-shaped elastically-deformable portions 88 that are connected to the pedal operation portion 420 and inserted into the corresponding receiving holes 91 to be elastically deformable; and a plurality of corresponding claws 89 corresponding to the respective elastically-deformable portions 88.

Each of the claws 89 is connected to the corresponding elastically-deformable portion 88 and protrudes from the opposite side of the pedal operation portion 420 with respect to the receiving hole 91. Further, each of the claws 89 does not enter, i.e., does not pull back or fall from, the receiving hole 85 because it is caught by a portion surrounding the receiving hole 91 on a bottom surface 410b of the pedal base portion 410. In such manner, the pedal base portion 410 and the pedal operation portion 420 are fixed to each other by snap-fitting.

Note that, when each of the claws 89 is moved closer to a central axis of the receiving hole 91, the corresponding elastically-deformable portion 88 is bent, and the engagement between the claw 89 and the bottom surface 410b is eliminated, i.e., the claw 89 is disengaged therefrom, and the claw 89 enters into the receiving hole 91. If such a disengagement is performed for all the engaging members 90, the pedal base portion 410 and the pedal operation portion 420 can be separated from each other.

Such a structure is realized as follows. When assembling the pedal base portion 410 and the pedal operation portion 420, the plurality of claws 89 belonging to the same engaging member 90 are moved closer to each other to bend the corresponding plurality of elastically-deformable portions 88. Then, by keeping such a state, the claw 89 is inserted into the corresponding receiving hole 91, and is then pushed out to protrude from the opposite side of the pedal operation portion 420 with respect to the receiving hole 91. Then, the plurality of claws 89 move away from each other, and the bending of the elastically-deformable portions 88 is eliminated. As a result, the claw 89 engages the bottom surface 410b. In such manner, the pedal operation portion 420 and the pedal base portion 410 are fixed to each other.

(1) As described above, the engaging member 90 integrally formed with the pedal operation portion 420 engages the pedal operation portion 420 with the pedal base portion 410 by snap-fitting using the receiving hole 91 formed in the pedal base portion 410. The snap-fitting fixes the pedal operation portion 420 and the pedal base portion 410 to each other. In such configuration, there is no need to provide a separate component for fixing the pedal operation portion 420 and the pedal base portion 410 together.

As another example, each of the engaging members 90 may protrude from a top surface 410a of the pedal base portion 410 toward the pedal operation portion 420 and may be formed integrally with the pedal base portion 410. In such case, the receiving hole 91 is formed at a position in the pedal operation portion 420, corresponding to the engaging member 90. The engaging member 90 integrally formed with the pedal base portion 410 is engaged with the pedal operation portion 420 by snap-fitting using the receiving hole 91 formed in the pedal operation portion 420. The snap-fitting fixes the pedal operation portion 420 and the pedal base portion 410 to each other. Similar effects can be obtained in such case as well.

Eighth Embodiment

Figure 13:
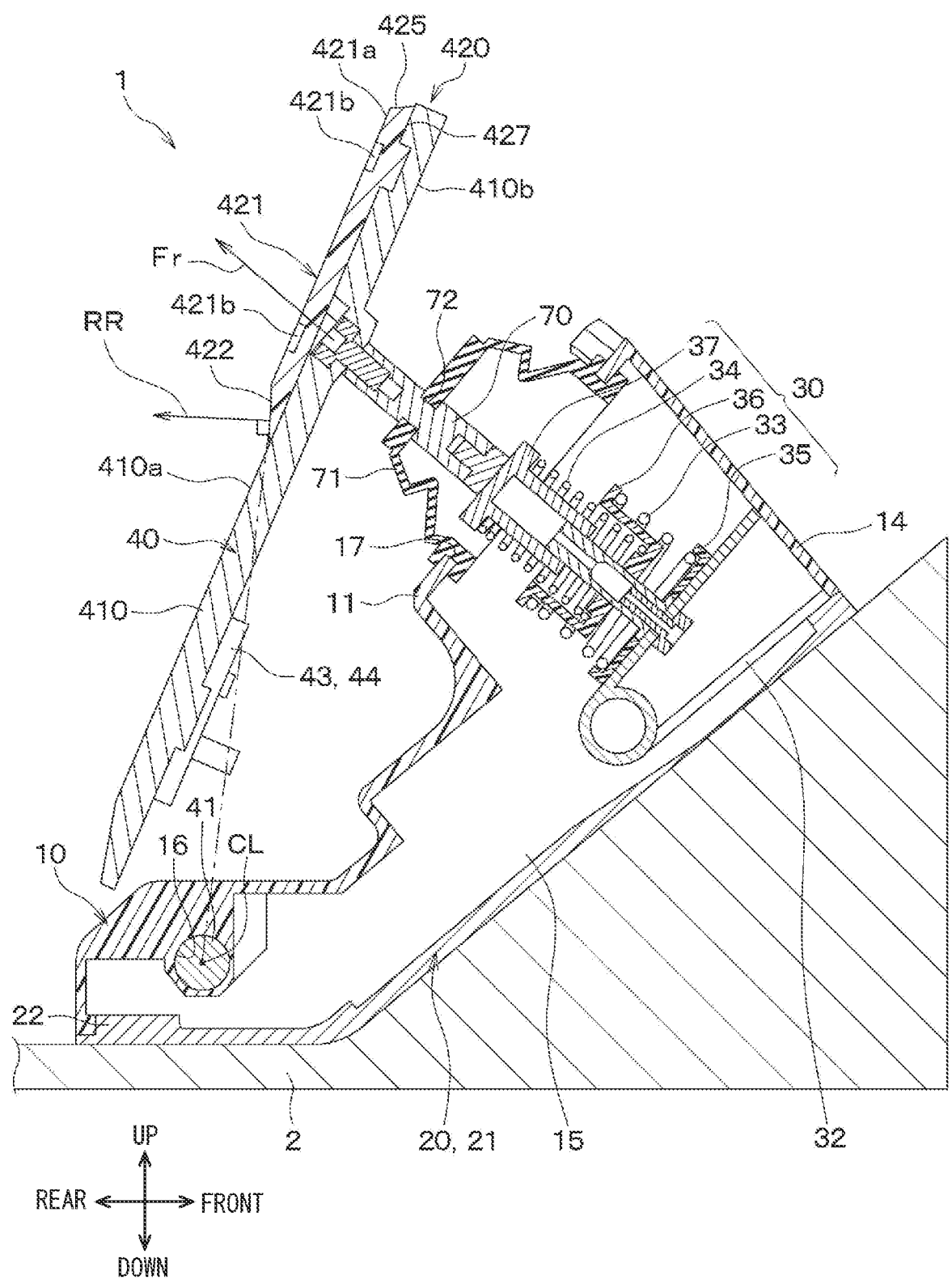
FIG. 13 is a cross-sectional view perpendicular to an axis of rotation of a pedal pad in a brake pedal device according to an eighth embodiment.

Next, the eighth embodiment will be described with reference to FIG. 13. In the present embodiment, the leaf spring 31 is replaced with a torsion spring 32 in contrast to the first to seventh embodiments. That is, a reaction force generation mechanism 30 has the torsion spring 32, a large-diameter coil spring 33, and a small-diameter coil spring 34 as elastic members. Other than the above, the present embodiment is the same as the first embodiment.

One end of the torsion spring 32 is fixed to a second housing 20, and the other end thereof is provided with a lower holder 35, the large-diameter coil spring 33, a spring seat 36, the small-diameter coil spring 34, an upper holder 37, a connecting rod 70, or the like disposed in this written order. A coil portion wound in a coil shape is provided at a position between one end and the other end of the torsion spring 32. An axis of the coil portion is parallel to a rotation axis CL.

By devising such a structure, the torsion spring 32, the large-diameter coil spring 33, and the small-diameter coil spring 34 bend according to their respective spring constants, and generate a reaction force against the stepping force applied to a pedal pad 40 by the driver.

Also, the torsion spring 32 is made of steel materials. Further, carbon content of the steel materials is 0.1% by weight or more. Alternatively, the torsion spring 32 may be made of other metals.

(1) According to the above, the reaction force generation mechanism 30 has the torsion spring 32, the large-diameter coil spring 33, and the small-diameter coil spring 34 made of steel materials. A torsion spring and a plate spring made of steel material suffer less by temperature change and humidity on their elastic force than rubber or a compressible fluid, thereby realizing stable stepping force characteristics. Also, in the present embodiment, the same or corresponding effects as those of the first to seventh embodiments can be obtained from the same or corresponding configuration.

Other Embodiments

The present disclosure is not limited to the above-described embodiments, and can appropriately be modified. Each of the above embodiments, which are relevant to each other, is combinable to the other one unless such combination is clearly difficult. The constituent element(s) of each of the above embodiments is/are not necessarily essential unless it is specifically stated that the constituent element(s) is/are essential in the above embodiments, or unless the constituent element(s) is/are obviously essential in principle. A quantity, a value, an amount, a range, or the like referred to in the description of the above embodiments is not necessarily limited to the described specific value, amount, range or the like unless it is specifically described as essential or understood as being essential in principle. Further, in the above embodiment, when it is described that the external environment information of the vehicle (for example, the humidity outside the vehicle) is acquired from a sensor, the sensor may be dispensable and the external environment information may be received from a server or a cloud outside the vehicle. Alternatively, it is possible to dispense the sensor, acquire related information related to the external environmental information from a server or cloud outside the vehicle, and estimate the external environmental information from the acquired related information. When multiple values are exemplified for a certain parameter, it is also possible to adopt a value between the multiple values unless an exception statement is made or when it is clearly impossible in principle. A shape, positional relationship or the like of a structural element or the like, which is referred to in the embodiments described above, is not limited to the described shape, positional relationship or the like, unless it is specifically described or obviously necessary to be limited in principle. In addition, the present disclosure allows the following modifications and modifications within the equivalent range of each of the above-described embodiments. The following modifications can be independently selected to be applied or not applied to the above-described embodiments. That is, the following modifications may be properly applicable to the above embodiments, independently or in any arbitrary combination.

FIRST MODIFICATION

In the above-described embodiments, the reaction force generation mechanism 30 is an example in which the coil spring and the plate spring are provided, and is an example in which the coil spring and the torsion spring are provided. However, an elastic member constituting the reaction force generation mechanism 30 is not limited to such a combination, and may also be composed only of a coil spring, only of a plate spring, or only of a torsion spring. Alternatively, a reaction force generation mechanism 30 may also be made of a leaf spring and a torsion spring. Alternatively, the reaction force generation mechanism 30 may also be made of a coil spring, a plate spring, and a torsion spring. Alternatively, the reaction force generation mechanism 30 may also be made of an elastic body that is neither a coil spring, a leaf spring, nor a torsion spring.

SECOND MODIFICATION

In the above-described embodiments, the anti-slip portion 421b composed only of protrusions and the anti-slip portion 421b composed only of concaves are exemplified. However, an anti-slip portion 421b may also be made of both of protrusions and concaves.

THIRD MODIFICATION

In the above embodiments, the brake system 100 is configured as a brake-by-wire system. However, a brake system 100 may also be applicable to a hydraulic brake system in which a reaction force is generated on a pedal pad 40 by the hydraulic pressure of the master cylinder. In the latter case, a return spring or the like that generates a reaction force on the pedal pad 40 separately from the hydraulic pressure of the master cylinder corresponds to the reaction force generation mechanism.

FOURTH MODIFICATION

In the first to third embodiments described above, the force generated by the reaction force generation mechanism 30 is transmitted from the connecting rod 70 to the pedal operation portion 420 via the pedal base portion 410. However, the force generated by a reaction force generation mechanism 30 may also be transmitted directly from a connecting rod 70 to a pedal operation portion 420 without passing through a pedal base portion 410. In such case, a connecting rod 70 contacts the pedal operation portion 420.

FIFTH MODIFICATION

In the above-described embodiments, the housing that covers the reaction force generation mechanism 30 is made of two separate bodies, i.e., the first housing 10 and the second housing 20. However, a housing that covers a reaction force generation mechanism 30 may be made of a single body.

What is claimed is:
1. A brake pedal device to be mounted on a vehicle, the brake pedal device comprising:
  a pedal pad configured to rotate about a predetermined axis when stepped on by a driver;
  a reaction force generation mechanism configured to generate a reaction force to the pedal pad according to a stepped amount of the pedal pad; and
  a housing configured to house at least a part of the reaction force generation mechanism, wherein
  the pedal pad includes
    a pedal base portion extending in an extending direction from one end close to the axis to another end, and
    a pedal operation portion attached to the pedal base portion to be stepped on by the driver, the pedal operation portion protrudes from the pedal base portion toward a pedal return side in a rotation direction about the axis,
the pedal base portion and the pedal operation portion are located outside the housing,
the pedal operation portion has a pedal surface to be stepped on by the driver,
in the extending direction, the pedal base portion extends closer to the axis than the pedal operation portion does,
the reaction force generation mechanism is configured to generate the reaction force acting on the pedal pad in a direction piercing the pedal surface;
the pedal operation portion has a stepped surface between the pedal base portion and the pedal surface in the extending direction; and
a cross-section of the pedal base portion as viewed in a direction perpendicular to the extension direction comprises a flat plate structure.

2. The brake pedal device according to claim 1, further comprising:
a connecting rod configured to transmit the reaction force generated by the reaction force generation mechanism to the pedal base portion, wherein
a first end of the connecting rod is connected to the reaction force generation mechanism and a second end of the connecting rod is connected to the pedal pad, and
a portion of the connecting rod connected to the pedal pad and the pedal surface overlap in the direction of rotation about the axis.

3. The brake pedal device according to claim 1, wherein the pedal surface of the pedal operation portion is provided with an anti-slip portion.

4. The brake pedal device according to claim 3, wherein the anti-slip portion has one or both of a concave portion having a concave shape with respect to the pedal surface and a convex portion having a convex shape with respect to the pedal surface.

5. The brake pedal device according to claim 3, wherein the anti-slip portion includes a rubber material.

6. The brake pedal device according to claim 1, wherein the pedal operation portion includes a resin material.

7. The brake pedal device according to claim 1, wherein a side surface of the pedal operation portion on one side in a lateral direction of the vehicle is inclined toward another side in the lateral direction of the vehicle as the side surface extends toward the pedal return side.

8. The brake pedal device according to claim 1, wherein a side surface of the pedal operation portion closest to the axis is inclined away from the axis as the side surface extends toward the pedal return side.

9. The brake pedal device according to claim 8, wherein the side surface is inclined toward the pedal base portion.

10. The brake pedal device according to claim 8, wherein an extension line of the side surface intersects with the pedal base portion.

11. The brake pedal device according to claim 1, wherein the pedal base portion and the pedal operation portion are made of a single plate.

12. The brake pedal device according to claim 1, wherein the pedal base portion and the pedal operation portion are made of separate parts.

13. The brake pedal device according to claim 12, wherein the pedal operation portion is fastened with the pedal base portion by a screw.

14. The brake pedal device according to claim 12, further comprising:
a protruding portion made integrally with one of the pedal operation portion or the pedal base portion, wherein
the pedal operation portion and the pedal base portion are fixed to each other by press-fitting the protruding portion into a receiving hole provided in an another one of the pedal operation portion and the pedal base portion.

15. The brake pedal device according to claim 12, further comprising:
a rivet made integrally with one of the pedal operation portion or the pedal base portion, wherein
the rivet includes
a body part inserted from one side into a receiving hole provided in an another one of the pedal operation portion and the pedal base portion, and
a head part protruding to an opposite side of the one of the pedal operation portion or the pedal base portion with respect to the receiving hole and having a larger diameter than that of the receiving hole, and
the rivet is configured to fix the pedal operation portion and the pedal base portion to each other.

16. The brake pedal device according to claim 12, further comprising:
an engaging member made integrally with one of the pedal operation portion or the pedal base portion, wherein
the engaging member is engaged with another one of the pedal operation portion and the pedal base portion by snap-fitting using a receiving hole provided in the another one of the pedal operation portion and the pedal base portion, and
the snap-fitting is configured to fix the pedal operation portion and the pedal base portion to each other.

17. The brake pedal device according to claim 1, wherein the reaction force generation mechanism includes one or more of a coil spring, a leaf spring and a torsion spring, respectively made of steel material.

18. The brake pedal device according to claim 1, wherein at least a part of members in the reaction force generation mechanism generating an elastic force as the reaction force includes a steel material, and carbon content of the steel material is 0.1% by weight or more.

19. A brake system comprising:
a brake caliper that generates a braking force by pressing a brake pad against a brake disc with a force corresponding to a hydraulic pressure;
an electric motor that adjusts the hydraulic pressure to the brake caliper;
an ECU that controls the electric motor based on a signal input thereto; and
the brake pedal device according to claim 1, wherein
the brake pedal device further includes a sensor unit configured to output a signal corresponding to a rotation angle of the pedal pad, and
the sensor unit outputs the signal corresponding to the rotation angle of the pedal pad to the ECU.

20. The brake system according to claim 19, further comprising
a master cylinder configured to increase the hydraulic pressure, wherein
the pedal pad is not mechanically connected to the master cylinder to cause the force transmitted by the hydraulic pressure to be not applied to the pedal pad as the reaction force.

21. The brake pedal device according to claim 1, wherein the pedal operation portion has an edge between the pedal base portion and the pedal surface in the extending direction.

22. The brake pedal device according to claim 1, wherein the pedal base portion and the pedal operation portion extend in the extending direction.

23. The brake pedal device according to claim 1, wherein each of the pedal base portion and the pedal operation portion are configured to be directly stepped on by the driver.

24. The brake pedal device according to claim 1, wherein a portion of the pedal operation portion that is farthest away from the predetermined axis in the extending direction extends toward a pedal depression side, and the pedal depression side is in the opposite direction as the pedal return side.

* * * * *